United States Patent [19]

Nordin

[11] 3,886,143

[45] May 27, 1975

[54] OXAZOLO [3,2-D]PYRAZOLO[4,3-F] [1,4]DIAZEPIN-6(7H)-ONE COMPOUNDS

[75] Inventor: Ivan C. Nordin, Ann Arbor, Mich.

[73] Assignee: Parke, Davis & Company, Detroit, Mich.

[22] Filed: Jan. 21, 1974

[21] Appl. No.: 434,817

[52] U.S. Cl.... 260/239.3 T; 260/239.3 B; 424/272; 424/273
[51] Int. Cl............................................ C07d 99/02
[58] Field of Search ............................... 260/239.3 T Primary Examiner—Henry R. Jiles
Assistant Examiner—Robert T. Bond

[57] ABSTRACT

Oxazolo[3,2-d]pyrazolo[4,3-f][1,4]diazepin-6(7H)-ones and methods for their preparation are disclosed. The compounds can be prepared by either of the following procedures: (a) Reacting 4-(o-fluorophenyl)-6,8-dihydro-1,3,8-trimethylpyrazolo[3,4-e][1,4]diazepin-7(1H)-one with an alkylene oxide; or (b) cyclizing the appropriately substituted 4-(o-fluorobenzoyl)-1,3-dimethyl-5-(N-methyl-[2-hydroxyalkylamino]acetamido)pyrazole via heat or an acid catalyst. The compounds are pharmacological agents, especially anticonvulsants.

4 Claims, No Drawings

OXAZOLO[3,2-D]PYRAZOLO[4,3-F][1,4]DIAZEPIN-6(7H)-ONE COMPOUNDS

SUMMARY AND DETAILED DESCRIPTION

The present invention relates to new heterocyclic nitrogen compounds that are useful as pharmacological agents and to methods for their production. More particularly, the invention relates to new oxazolo[3,2-d]pyrazolo[4,3-f][1,4]-diazepin-6(7H)-one compounds having the formula

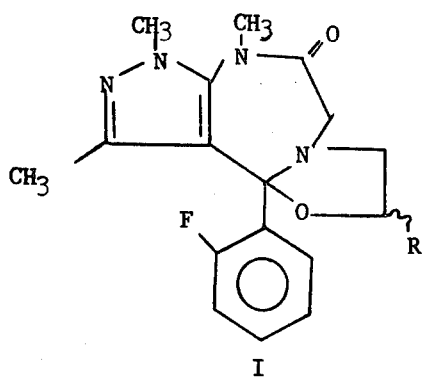

I wherein R is hydrogen, methyl or phenyl.

In accordance with the invention, oxazolo[3,2-d]pyrazolo[4,3-f][1,4]diazepin-6(7H)-one compounds of the formula I are produced by reacting a compound of the formula

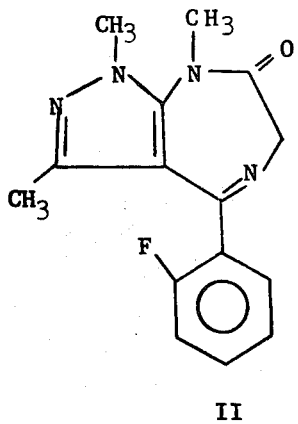

II with a compound of the formula

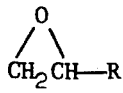

wherein R is as previously defined, in the presence of a Lewis acid, such as aluminum chloride, stannic chloride, boron trifluoride and titanium tetrachloride. The preferred catalysts are aluminum chloride and stannic chloride.

Equimolar quantities of reactants and catalyst may be used. It is preferred however to use a slight to moderate excess of catalyst and a moderate to large excess (threefold) of alkylene oxide. The products are isolated in the form of their free bases.

Most organic solvents which are inert to the above reactants and catalysts may be employed. The preferred solvents include aromatic hydrocarbons, such as benzene, toluene and xylene; chlorinated hydrocarbons, such as chloroform and dichloromethane; and mixtures of these. The two most preferred solvents are benzene and chloroform.

While the temperature range and time are not critical, generally, a temperature range of 0° to 100° C. for 5 to 30 hours are used with the longer times being employed at the lower temperatures. When employing aluminum chloride as the catalyst, generally lower temperatures are used.

The starting materials of the structure of formula II are prepared by the general methods disclosed in U.S. Pat. No. 3,558,605, which is incorporated by reference.

A second method for preparing compounds of this invention (I) involves the cyclization of a compound of the formula

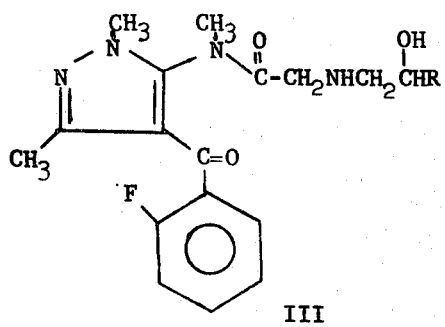

III wherein R is as previously defined.

The cyclization may be accomplished by heat alone; however, the preferred method requires the use of a catalyst with or without heat. The catalysts which promote the ring closure are acid catalysts, such as mineral acids, e.g. hydrochloric acid and sulfuric acid; hydrocarbon sulfonic acids, e.g. p-toluene sulfonic acid and methanesulfonic acid and organic acids, e.g. acetic acid and propionic acid. The acids may be formed in situ, e.g. from the reaction between sodium acetate and hydrogen bromide.

A wide variety of solvents may be used in the cyclization reaction, such as branched or straight chain lower alkanols of up to about six carbon atoms, e.g. methanol, ethanol and 2-propanol; tertiary amines, e.g. triethylamine and pyridine; hydrocarbons, e.g. benzene and toluene; and mixtures of the aforementioned solvents.

While numerous factors dictate the temperature to be used in the ring closure reactions, e.g. the more sterically hindered compounds require higher temperatures and/or longer heating periods, a range of from about 50° to about 150° C. for from approximately 12 hours to approximately 4 days in generally quite satisfactory. The quantity of catalyst may also vary but is generally in the range of 0.5 to 3.0 percent.

Generally, the compounds of formula III are not isolated, but are formed by reacting a compound of the formula

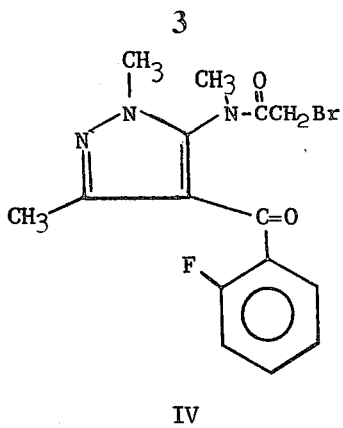

IV with a compound of the formula

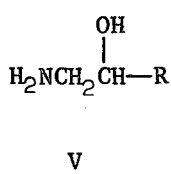

V wherein R is as previously defined, and directly ring closed to the compounds of this invention.

However, if desired the starting materials of the formula III may be prepared by reacting a compound of the structure of formula IV with a compound of the formula V wherein R is as previously defined and the intermediate of the formula III may be isolated and cyclized in the manner previously described.

The compounds of this invention are isolated in the form of their free bases. It should be noted that the compounds of this invention are capable of existing in isomeric forms; and, in point of fact, some of the compounds appear to be isolated as mixtures of cis and trans isomers as shown in the structural formulae.

This invention is intended to encompass the numerous isomeric forms such as the cis isomers, trans isomers and mixtures, thereof.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen et al., *A.M.A. Archives of Neurology and Psychiatry*, Vol. 66, pages 329–337 (1951), and Vol. 68, pages 498–505 (1952), and by Chen et al., *Journal of Pharmacology and Experimental Therapeutics*, Vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained for the compounds of the present invention when tested by the foregoing procedure are shown in the following table.

ACTIVITY TABLE

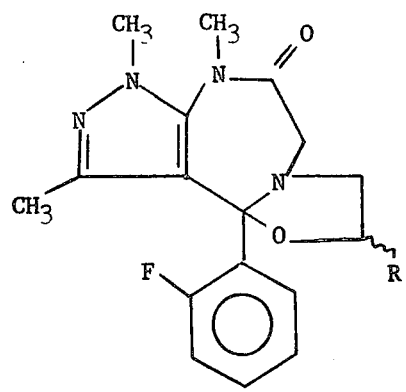

| Number | R | Dose (mg./kg.) | Rating |
|--------|-----|----------------|--------|
| 1 | H | 4 | 4 |
|   |   | 2 | 0 |
| 2 | $C_6H_5$ | 32 | 4 |
|   |   | 16 | 3 |
|   |   | 8 | 1 |
|   |   | 4 | 0 |
| 3 | $CH_3$ | 8 | 4 |
|   |   | 4 | 2 |
|   |   | 2 | 0 |

The invention is illustrated by the following examples.

EXAMPLE 1

A mixture of 14.3 g. of 4-(o-fluorophenyl)-6,8-dihydro-1,3,8-trimethylpyrazolo[3,4-e][1,4]diazepin-7(1H)-one (U.S. Pat. No. 3,558,605) and 13.3 g. of aluminum chloride in 300 ml. of benzene is stirred at room temperature for 15 minutes, cooled to 10° and treated with 10 ml. of ethylene oxide. After the initial exothermic reaction has subsided, the mixture is cooled again to 10°, 15 ml. of ethylene oxide is added and the mixture is stirred at room temperature for 16 hours, then filtered. The filtrate is evaporated at reduced pressure and the residue is stirred with a mixture of dichloromethane and concentrated aqueous ammonia. The organic phase is separated, washed with water, dried and evaporated at reduced pressure to give 10b-(o-fluorophenyl)-2,3,8,10b-tetrahydro-7,8,10-trimethyl-5H-oxazolo[3,2-d]pyrazolo[4,3-f][1,4]diazepin-6(7H)-one; m.p. 173°–175° after crystallizations from ethyl acetate/ether and from ethyl acetate/pentane.

By substituting 13 g. of stannic chloride for the aluminum chloride, 500 ml. of chloroform for the benzene, and 18 g. (total) of styrene oxide for the ethylene oxide in the above procedure, there is obtained 10b-(o-fluorophenyl)-2,3,8,10b-tetrahydro-7,8,10-trimethyl-2-phenyl-5H-oxazolo-[3,2-d]pyrazolo[4,3-f][1,4]diazepin-6(7H)-one which is purified by chromatography on a column of silical gel. The column is eluted with 7:3 (v/v) toluene/acetonitrile and the eluate is evaporated at reduced pressure to give crystals; m.p. 191°–194° after two recrystallizations from ethanol.

EXAMPLE 2

A mixture of 22.8 g. of 4-(o-fluorobenzoyl)-1,3-dimethyl-5-(N-methyl-2-bromoacetamido)pyrazole, 6.0 g. of 1-amino-2-propanol, 6.1 g. of anhydrous sodium acetate and 300 ml. of methanol is stirred and heated at reflux for 18 hours, then evaporated at reduced pressure. The residue is extracted with dichloromethane and the extract is washed with 5% aqueous potassium carbonate, with water, dried and evaporated at reduced pressure. The residual oil is dissolved in a small amount of acetonitrile and the solution chromatographed on a column of silica gel. The column is eluted with 3:1 (v/v) toluene/acetonitrile and the eluate is evaporated at reduced pressure to give 10b-(o-fluorophenyl)-2,3,8,10b-tetrahydro-2,7,8,10-tetramethyl-5H-oxazolo[3,2-d]pyrazolo-[4,3-f][1,4]diazepin-6(7H)-one; m.p. 156°–158.5° after crystallizations from acetonitrile and from ethyl acetate/pentane.

To a stirred mixture of 120 g. of 4-(o-fluorobenzoyl)-1,3-dimethyl-5-(methylamino)pyrazole (U.S. Pat. No. 3,558,605) dissolved in 1200 ml. of 1,2-dichloroethane, 280 ml. of water and 30 g. of calcium carbonate, is added dropwise at 12° 100 g. of bromoacetyl bromide. The mixture is stirred at 10°–20° for 1.5 hours, then filtered. The organic phase is separated from the filtrate, dried and evaporated at reduced pressure to give 4-(o-fluorobenzoyl)-1,3-dimethyl-5-(N-methyl-2-bromoacetamido)pyrazole; m.p. 111°–114° after crystallization from cyclohexane.

I claim:
1. A compound of the formula

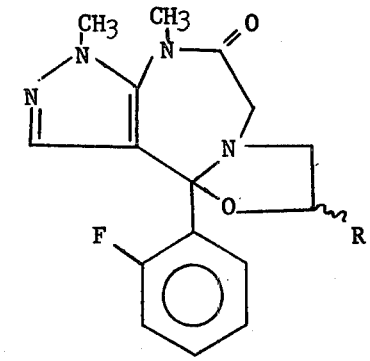

wherein R is hydrogen, methyl or phenyl.

2. The compound according to claim 1 which is 10b-(o-fluorophenyl)-2,3,8,10b-tetrahydro-7,8,10-trimethyl-5H-oxazolo[3,2-d]pyrazolo[4,3-f][1,4]diazepin-6(7H)-one.

3. The compound according to claim 1 which is 10b-(o-fluorophenyl)-2,3,8,10b-tetrahydro-7,8,10-trimethyl-2-phenyl-5H-oxazolo[3,2-d]pyrazolo[4,3-f][1,4]diazepin-6(7H)-one.

4. The compound according to claim 1 which is 10b-(o-fluorophenyl)-2,3,8,10b-tetrahydro-2,7,8,10-tetramethyl-5H-oxazolo[3,2-d]pyrazolo[4,3-f][1,4]diazepin-6(7H)-one.

* * * * *

UNITED STATES PATENT AND TRADEMARK OFFICE
CERTIFICATE OF CORRECTION

PATENT NO. : 3,886,143
DATED : May 27, 1975
INVENTOR(S) : Ivan C. Nordin

It is certified that error appears in the above-identified patent and that said Letters Patent are hereby corrected as shown below:

In place of formula in column 6, lines 10-25, insert the following formula:

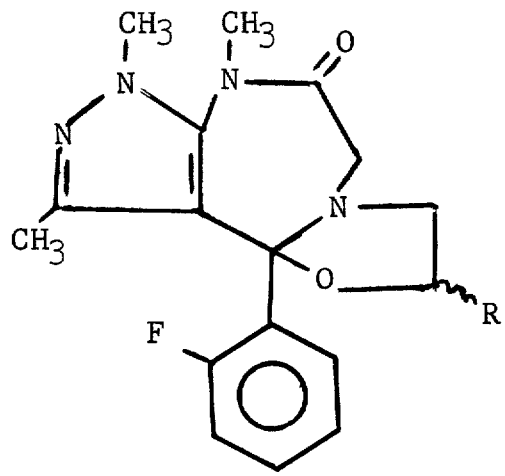

Signed and Sealed this second Day of September 1975

[SEAL]

Attest:

RUTH C. MASON
*Attesting Officer*

C. MARSHALL DANN
*Commissioner of Patents and Trademarks*